No. 646,615. Patented Apr. 3, 1900.
H. J. ALLEN.
HEADLIGHT.
(Application filed Dec. 7, 1899.)
(No Model.)
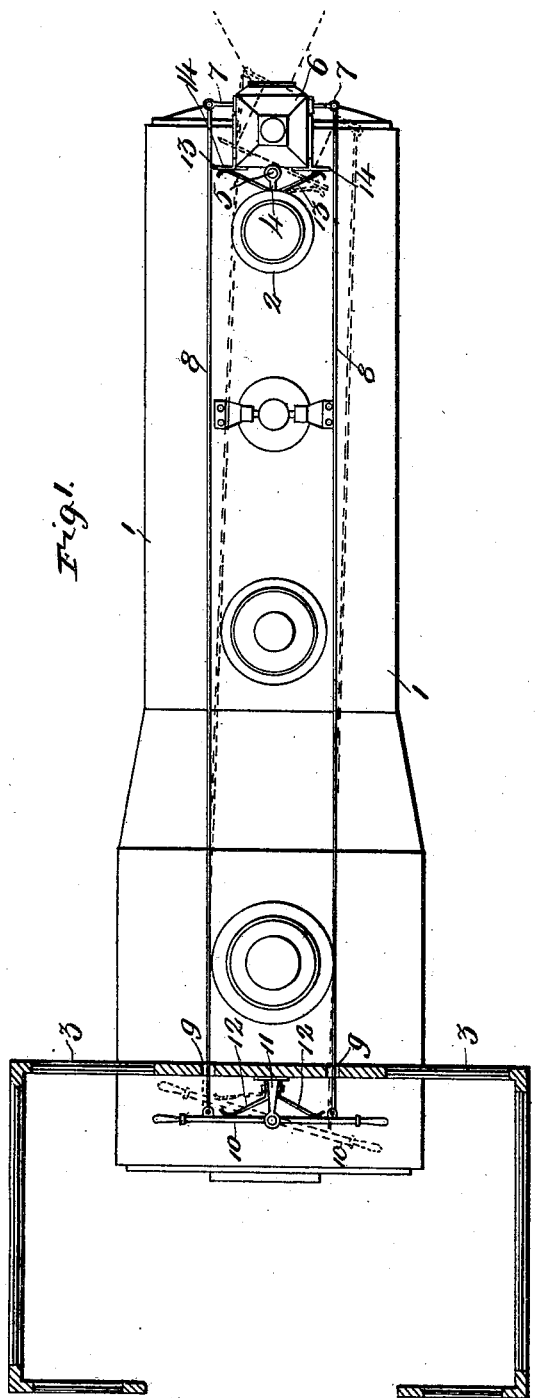
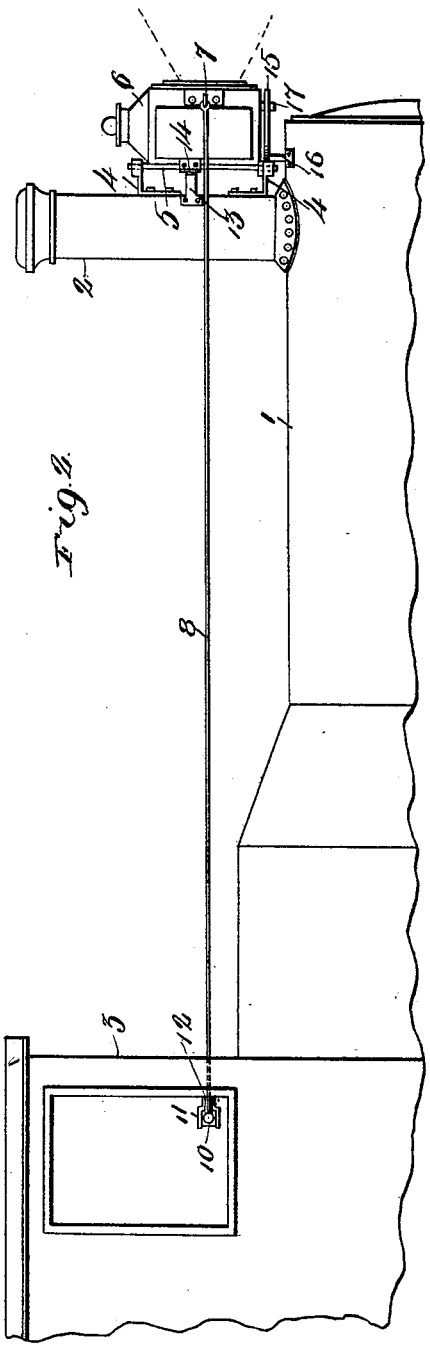
WITNESSES:
INVENTOR.
Henry J. Allen,
BY
ATTORNEYS.
THE NORRIS PETERS CO., PHOTO-LITHO., WASHINGTON, D. C.

United States Patent Office.

HENRY J. ALLEN, OF ST. LOUIS, MISSOURI.

HEADLIGHT.

SPECIFICATION forming part of Letters Patent No. 646,615, dated April 3, 1900.

Application filed December 7, 1899. Serial No. 739,536. (No model.)

*To all whom it may concern:*

Be it known that I, HENRY J. ALLEN, a citizen of the United States, residing at St. Louis, in the State of Missouri, have invented certain new and useful Improvements in Locomotive-Headlights; and I do hereby declare the following to be a full, clear, and exact description of the invention, such as will enable others skilled in the art to which it appertains to make and use the same.

My invention relates to improvements in locomotive-headlights; and it consists in the novel combination and arrangement of parts, as will be hereinafter more particularly described and claimed.

In the drawings, Figure 1 is a top plan view of my complete invention, showing its connection with the locomotive; and Fig. 2 is a side view of the same.

The object of my invention is to construct a simple and practical locomotive-headlight or one that may be moved or adjusted in such a position as to throw the light departed therefrom in any direction and is especially adapted to be used when the locomotive is about to approach a curve in the track, whereby the light from the headlight may be made to follow the track or curvature of the same.

Referring to the drawings, 1 represents the usual boiler of the locomotive, 2 the smokestack of the same, and 3 the cab, all of which are of the well-known construction.

Fixed to the smoke-stack 2 of the locomotive or any other stationary part thereof are brackets 4, which form suitable bearings for receiving the projecting ends of a rod 5, fixed to the ordinary headlight 6, whereby the latter is secured in a pivotal manner to the locomotive instead of rigidly, as heretofore. Projecting from the opposite sides of the headlight 6 are two arms 7, to which are secured one end of the ropes or rods 8, the opposite ends of the latter passing through openings 9, formed in the cab 3 of the locomotive and attached to the lever 10 on either side of its pivotal connection, the said lever adapted to be operated by the engineer, fireman, or other attendant located within the cab of the locomotive, the said lever 10 being pivotally connected to a projecting bearing 11, to which are secured two flat springs 12, the free ends of which coöperate with said lever on either side of its pivotal connection and operate to hold the same in an operative position when the headlight is in a straight or normal position.

In order to hold the headlight 6 in a proper or straight position in respect to the locomotive, notwithstanding the irregularities of the remaining parts, flat springs 13 are employed, which in the present instance are attached to the smoke-stack 2 of the locomotive, and having their free ends normally in contact with the projecting arms or plates 14, fixed to and carried by the headlight 6, which springs or either one of the same will yield sufficiently when the operating-lever 10 is pulled in either direction for the purpose of properly directing the light from the headlight in the proper direction upon the track.

In operating the device, or when the locomotive is about to approach a curve in the track, the proper end of the operating-lever is pulled by the attendant in the cab of the locomotive, in which operation the headlight 6 is simultaneously turned or operated, causing the light issuing therefrom to be properly directed upon the track in advance of the locomotive or in any direction that may be desired by said attendant.

I do not limit myself to the precise construction and arrangement of the parts as herein shown and described, as the same may be varied without departing from the nature of my invention, the principal object being to construct a headlight for locomotives in such a manner that the same may be properly turned in a suitable position to throw the light issuing therefrom in a direction to follow the track in advance of the locomotive.

As shown in Fig. 2, the lower bracket 4 is provided with an outwardly-extending plate 15 and a support 16, depending therefrom and attached to the boiler 1, whereby the headlight 6 is supported rigidly in the various positions which the same may assume, a roller 17 being carried by said projecting plate 15, upon which the lower surface of the headlight rests.

Having fully described my invention, what I claim is—

1. In combination with a locomotive, of a pivoted headlight, springs coöperating with the latter, for holding the same in a straight or normal position, an operating-lever pivotally secured within the cab of the locomotive, springs coöperating with said lever, and rods or ropes connecting the latter and headlight, substantially as, and for the purpose described.

2. In combination with a locomotive, of a pivoted headlight, arms projecting from the opposite sides of the same, springs fixed to the stationary part of the locomotive, the free ends of which coöperate with said headlight, for holding the same in a straight or normal position, a bearing secured within the cab of the locomotive, an operating-lever pivotally secured to the same about its medial portion, springs fixed to said bearing or bracket, the free ends of which coöperate with said lever, and rods or ropes connecting the latter and projecting arms of the headlight, substantially as described.

In testimony whereof I affix my signature in presence of two witnesses.

HENRY J. ALLEN.

Witnesses:
C. F. KELLER.
VANE. M. BETHE.